(12) United States Patent
Hong (10) Patent No.: US 6,808,137 B2
(45) Date of Patent: Oct. 26, 2004

(54) FISHING SPINNING REEL (75) Inventor: Eugene Hong, 11F-6, No. 333, Sec. 2, Hwa-Mei West Street, Taichung (TW)

(73) Assignee: Eugene Hong, Taichung (TW)

( * ) Notice: Subject to any disclaimer, the term of this patent is extended or adjusted under 35 U.S.C. 154(b) by 0 days.

(21) Appl. No.: 10/412,474

(22) Filed: Apr. 11, 2003

(65) Prior Publication Data

US 2004/0173704 A1 Sep. 9, 2004

(51) Int. Cl.$^7$ ............................................... A01K 89/01
(52) U.S. Cl. ....................................... 242/242; 242/273
(58) Field of Search ............................... 242/241, 242, 242/249, 273, 278

(56) References Cited

U.S. PATENT DOCUMENTS 3,367,597 A * 2/1968 Kenneth ..................... 242/242
5,012,990 A * 5/1991 Kawabe ...................... 242/242
5,118,047 A * 6/1992 Carpenter et al. .......... 242/241
6,082,650 A * 7/2000 Okada et al. ............... 242/242
6,170,773 B1 * 1/2001 Okada ........................ 242/242
6,264,125 B1 * 7/2001 Cockerham et al. ........ 242/242
6,394,379 B1 * 5/2002 Ivie ............................. 242/242

* cited by examiner

Primary Examiner—Emmanuel Marcelo
(74) Attorney, Agent, or Firm—Merchant & Gould P.C.

(57) ABSTRACT

A fishing spinning reel includes a rotating member disposed rotatably in a reel frame about a first axis, and a coupling member disposed movably in the reel frame and connected to a reciprocating spool spindle. A cam member has a first cam end loosely engaging a slot in the rotating member to be movable along a non-circular path defined by a non-circular guideway, and a second cam end engaging a cam follower of the coupling member. When the first cam end is moved by rotating movement of the rotating member through a handle, the coupling member and the spindle reciprocate along a second axis perpendicular to the first axis.

1 Claim, 8 Drawing Sheets

FISHING SPINNING REEL

BACKGROUND OF THE INVENTION

1. Field of the Invention

This invention relates to a fishing spinning reel, more particularly to a fishing spinning reel which has a cam member to drive a spool spindle to reciprocate with an increased changeable range of the distance, and a spool on which a fishline is wound with a quite even distribution.

2. Description of the Related Art

Figure 1:
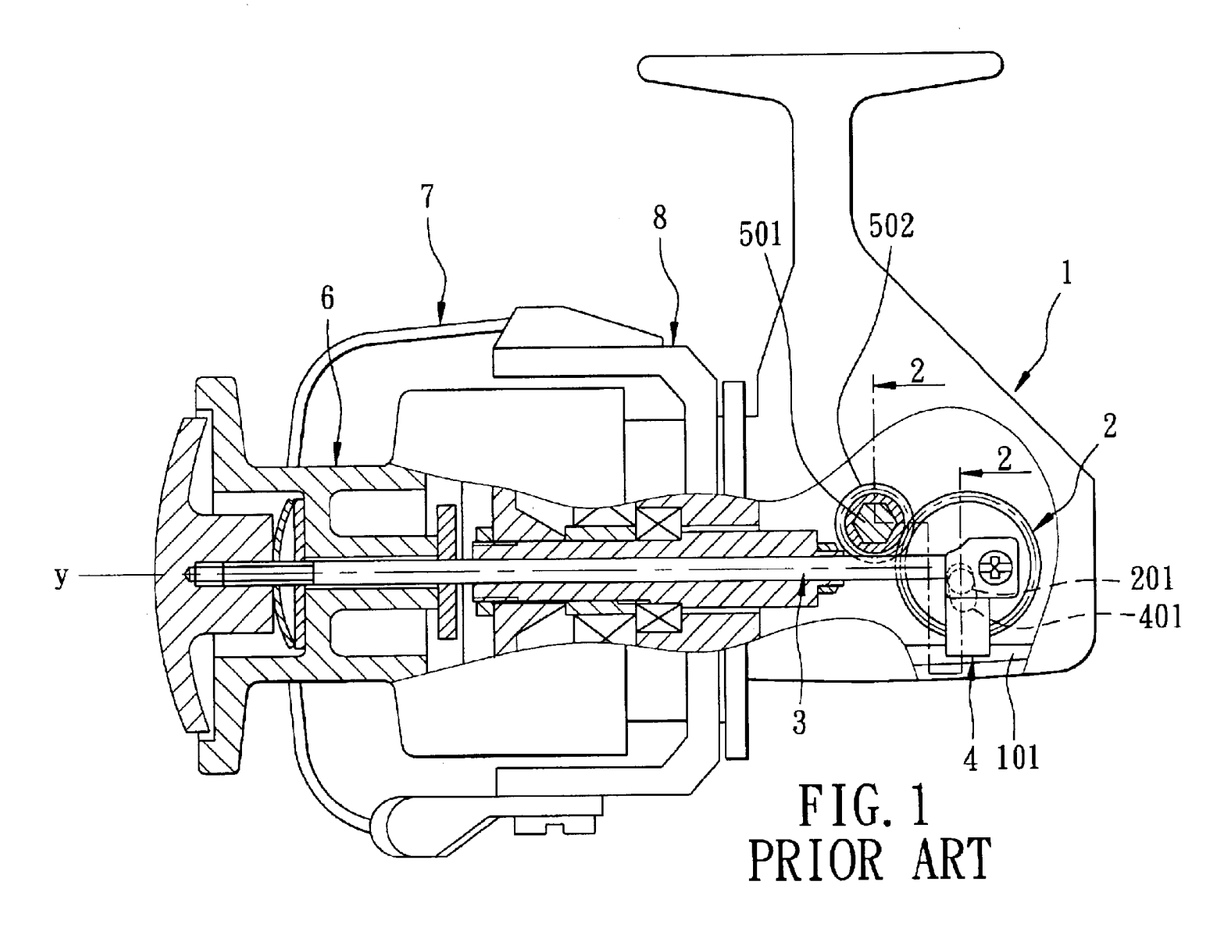
FIG. 1 is a partly sectional view of a conventional fishing spinning reel.
Figure 2:
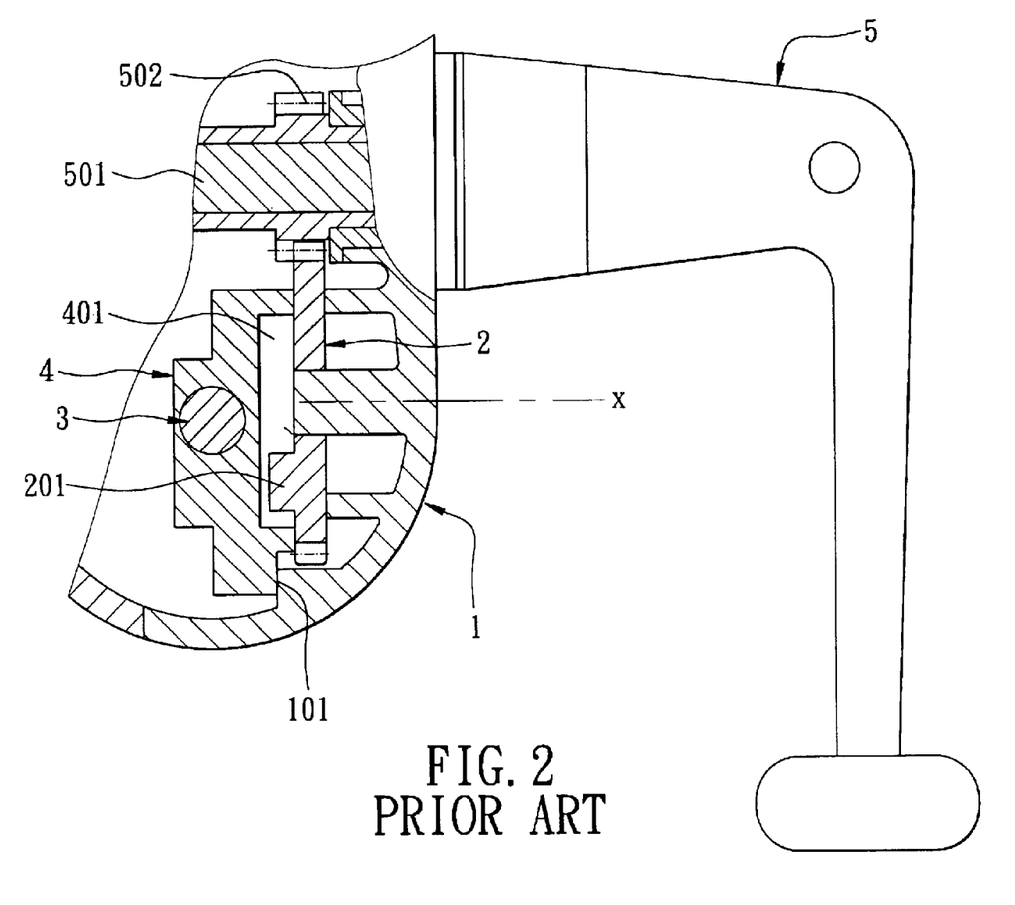
FIG. 2 is a fragmentary, partly sectional view of the conventional fishing spinning reel, taken along lines 2-2 of FIG. 1.

Referring to FIGS. 1 and 2, a conventional fishing spinning reel is shown to include a reel body 1, a rotating member 2, a reciprocating spool spindle 3, a coupling member 4, a handle 5, a spool 6, a bail unit 7, and a rotating unit 8. The reel body 1 is formed with a shoulder 101. The rotating member 2 is mounted in the reel body 1, and is rotatable relative to the reel body 1 about a first axis (x), and has an integral eccentric post 201. The reciprocating spool spindle 3 is disposed in the reel body 1, and is movable relative to the reel body 1 along a second axis (y) that is perpendicular to the first axis (x). The coupling member 4 is connected to the spindle 3, and is movable on the shoulder 101 of the reel body 1. The post 201 of the rotating member 2 is received movably in an elongate slot 401 formed in the coupling member 4. The handle 5 has a handle axle 501 and an integral gear 502 which is sleeved on the handle axle 501 and which meshes with the rotating member 2 so as to transfer rotation of the handle 5 to the rotating member 2. When the handle 5 and the rotating member 2 rotate, the post 201 moves in the reel body 1 along a circular path so as to reciprocate the spindle 3 along the second axis (y), and the rotating unit 8 and the bail unit 7 rotate about the second axis (y). As such, a fishline (not shown) can be wound around or unwound from the spool 6. The aforesaid conventional fishing spinning reel suffers from the following disadvantages:

1. When the fishline is wound on the spool 6, it is shaped as a tubular unit, and is formed with a plurality of turns. The spindle 3 effects a forward travel and a reverse travel during each revolution of the rotating member 2. The number of the turns during each forward travel of the spindle 3 is equal to that formed during each reverse travel of the spindle 3. In addition, the number of the turns formed at two end portions of the spool 6 is greater than that formed at a middle portion of the spool 6, thereby resulting in an uneven distribution of the fishline on the spool 6. Such an uneven fishline distribution will affect adversely smooth winding and unwinding operations of the fishing spinning reel.

2. The spindle 3 moves between two end positions, which are spaced apart from each other by a distance that is twice the distance between the post 201 of the rotating member 2 and the first axis (x). Because the changeable range of the distance between the post 201 and the first axis (x) is relatively small due to the volume constraint of the reel body 1, the changeable range of the distance between the end positions is reduced, thereby affecting utility of the fishing spinning reel.

SUMMARY OF THE INVENTION

The object of the present invention is to provide a fishing spinning reel including a spool spindle that is capable of reciprocating with an increased changeable range of distance, and a spool on which a fishline is wound with a quite even distribution.

According to this invention, the fishing spinning reel includes a reel frame, and a rotating member disposed in the reel frame and rotatable relative to the reel frame about a first axis in an axial direction. The rotating member has a major wall which defines a plane normal to the first axis, and a slot which is formed in the major wall and which extends towards the first axis. A reciprocating spool spindle is disposed in the reel frame and is movable relative to the reel frame along a second axis that is perpendicular to the first axis. The reciprocating spool spindle has first and second spindle ends opposite to each other along the second axis. A coupling member is connected to the first spindle end of the reciprocating spool spindle, and has a cam follower which confronts the major wall of the rotating member in the axial direction. A cam member has first and second cam ends disposed opposite to each other in the axial direction. The first cam end is loosely engaged in the slot such that the first cam end is movable relative to the first axis when the rotating member is rotated about the first axis. The second cam end engages the cam follower such that the coupling member and the reciprocating spool spindle reciprocate along the second axis when the first cam end is moved relative to the first axis by rotating movement of the rotating member. A non-circular guideway is disposed to guide the first cam end to move along a non-circular path. A handle is mounted on and is rotatable relative to the reel frame to drive the rotating member to rotate about the first axis. A spool is mounted to the second spindle end of the reciprocating spool spindle to be moved with and rotatable relative to the reciprocating spool spindle for winding a fishline.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Figure 3:
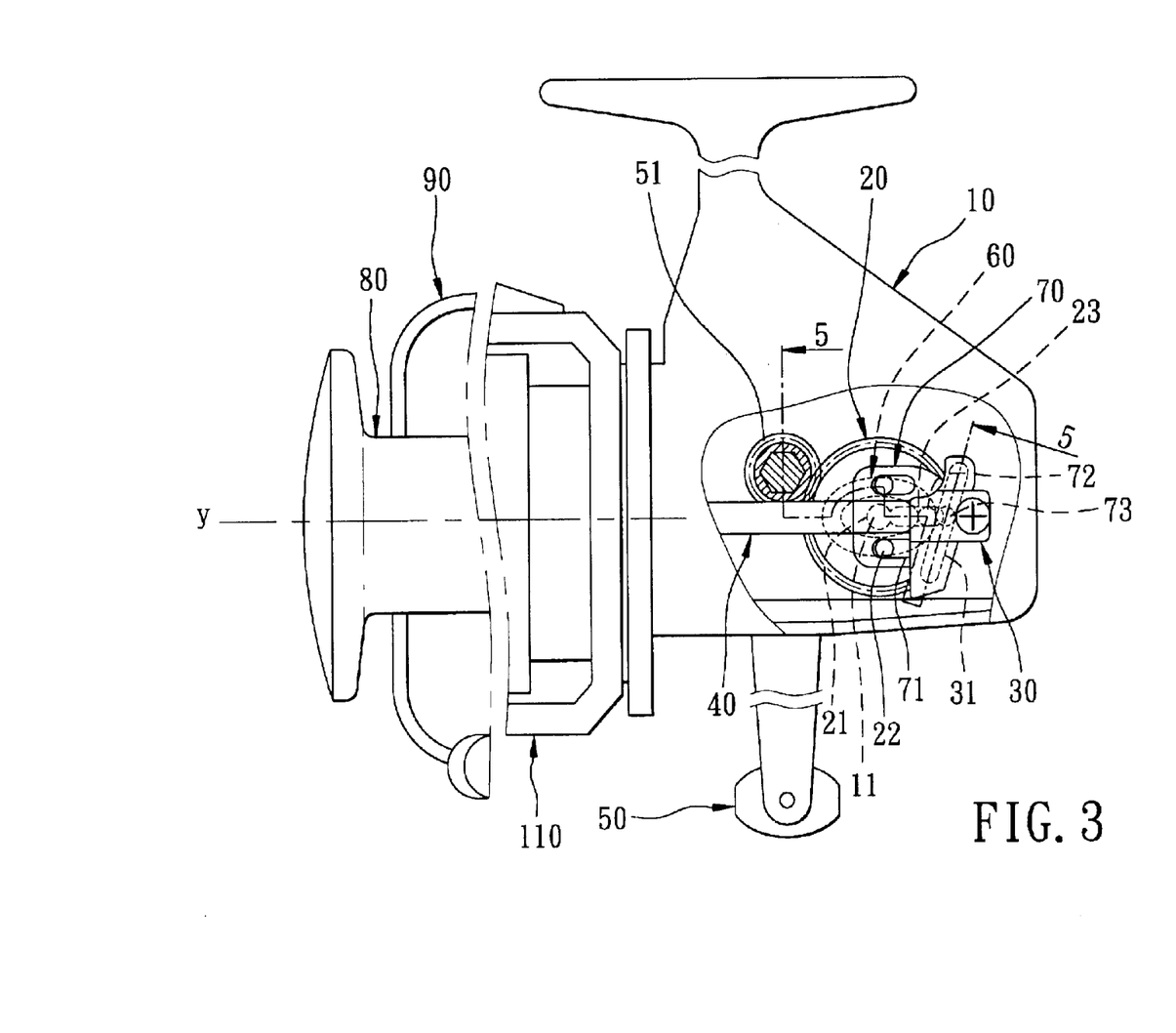
FIG. 3 is a partly sectional view of the first preferred embodiment of a fishing spinning reel according to this invention.
Figure 4:
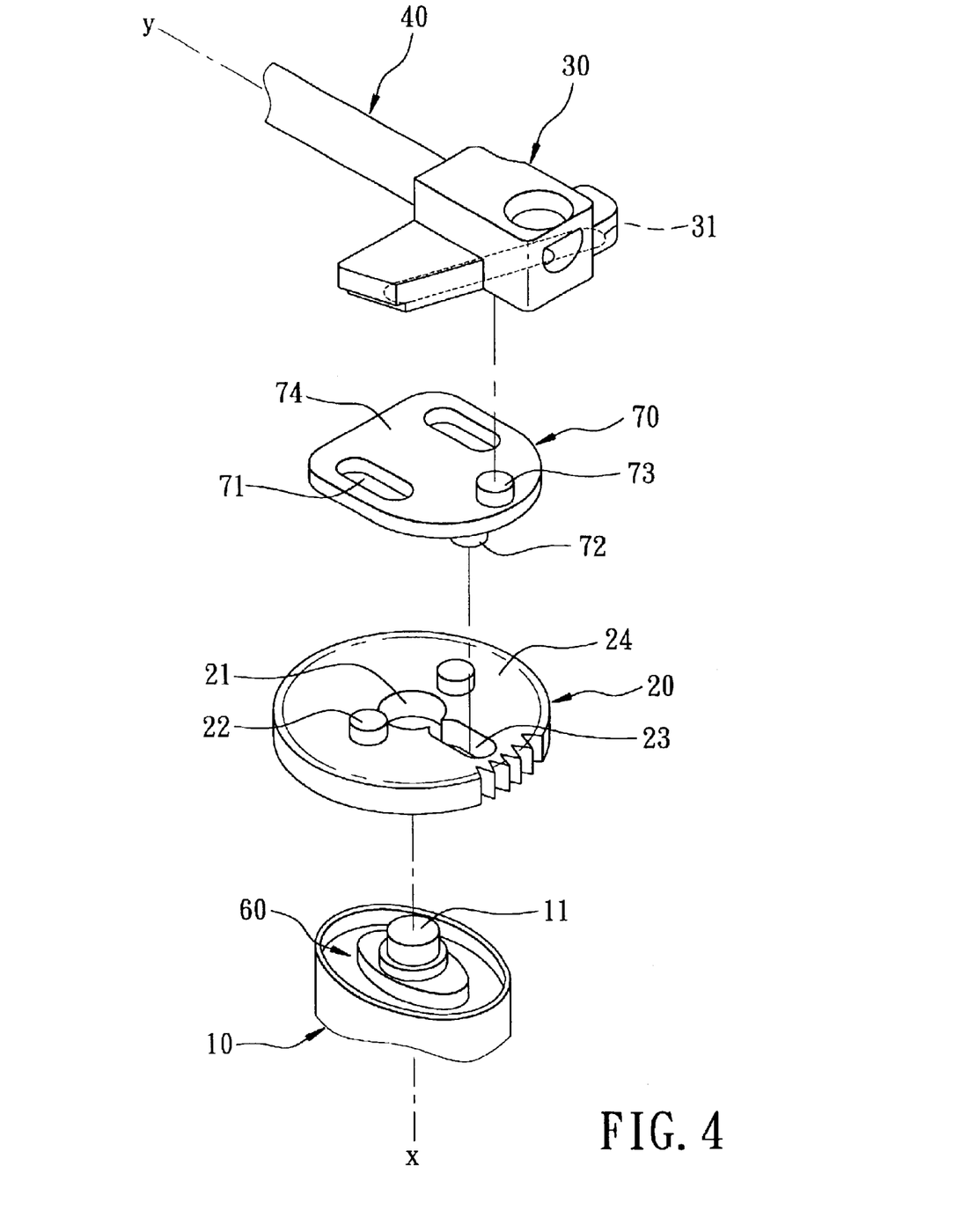
FIG. 4 is an exploded perspective view of a portion of the first preferred embodiment.
Figure 5:
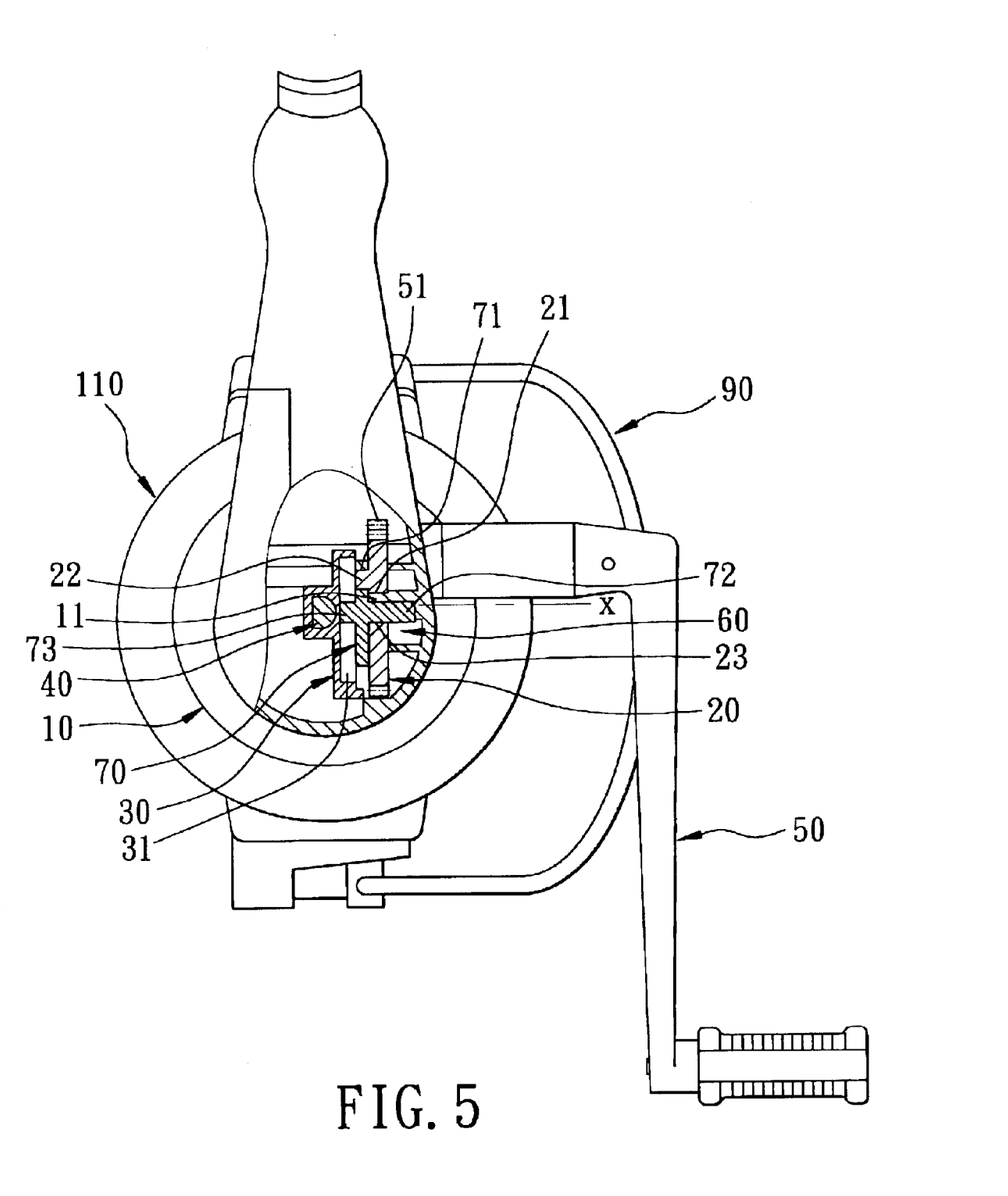
FIG. 5 is fragmentary, partly sectional view of the first preferred embodiment, taken along lines 5-5 of FIG. 3.

Referring to FIGS. 3 to 5, the first preferred embodiment of a fishing spinning reel according to the present invention is shown to comprise a reel frame 10, a rotating member 20, a coupling member 30, a reciprocating spool spindle 40, a handle 50, a non-circular guideway 60, a cam member 70, a spool 80, a bail unit 90, and a rotating unit 110.

The reel frame 10 is a hollow body, and includes a positioning post 11 which extends along a first axis (x) in an axial direction.

The non-circular guideway 60 is disposed in the reel frame 10 to surround the first axis (x), and defines a non-circular path in elliptical shape. The non-circular guideway 60 can be integrally formed with the reel frame 10.

The rotating member 20 is disposed in the reel frame 10, and has an axial hole 21 to engage the positioning post 11 so as to be rotatable relative to the reel frame 10 about the first axis (x) in the axial direction. The rotating member 20 has a major wall 24 which defines a plane normal to the first axis (x), a slot 23 which is formed through the major wall 24 and which extends towards the first axis (x), and a pair of posts 22 which extend from the major wall 24 in the axial direction. The rotating member 20 is configured as a spur gear.

The reciprocating spool spindle 40 is disposed in the reel frame 10, and is movable relative to the reel frame 10 along a second axis (y) that is perpendicular to the first axis (x), and has first and second spindle ends opposite to each other along the second axis.

The coupling member 30 is connected to the first spindle end of the reciprocating spool spindle 40, and has a cam follower 31 which confronts the major wall 24 of the rotating member 20 in the axial direction. In this embodiment, the cam follower 31 is configured as an elongate sliding groove, and includes two opposing walls which are spaced apart from each other in a longitudinal direction parallel to the second axis (y) by a distance.

The cam member 70 is disposed at an opposite side of the major wall 24 of the rotating member 20 relative to the non-circular guideway 60, and includes a slider 74, a first cam end 72, a second cam end 73, and a pair of elongate grooves 71. The slider 74 is mounted on and is movable relative to the major wall 24 of the rotating member 20. The first cam end 72 projects from the slider 74 in the axial direction to be received and loosely engaged in the slot 23 such that the first cam end 72 is movable relative to the first axis (x) when the rotating member 20 is rotated about the first axis (x). The first cam end 72 further extends downwardly and outwardly of the slot 23 so as to be in sliding contact with the non-circular guideway 60 such that the first cam end 72 is guided to move along the non-circular path, i.e. an elliptical path. The second cam end 73 is disposed opposite to the first cam end 72 in the axial direction. The second cam end 73 has a diameter substantially equal to the distance between the opposing walls of the cam follower 31, and projects from the slider 74 in the axial direction so as to be inserted into and engage the cam follower 31. As such, when the first cam end 72 is moved relative to the first axis (x) by rotating movement of the rotating member 20, the coupling member 30 and the reciprocating spool spindle 40 reciprocate along the second axis (y). The elongate grooves 71 are formed in the slider 74 to slidably accommodate the posts 22 so as to cooperate with the posts 22 to serve as a stabilizing member for regulating the course of movement of the slider 74 relative to the major wall 24. The movement of the first cam end 72 along the non-circular path is thus stabilized.

The handle 50 is mounted on and is rotatable relative to the reel frame 10, and has a gear 51 which meshes with the rotating member 20 to drive the rotating member 20 to rotate about the first axis (x).

The spool 80 is mounted to the second spindle end of is the reciprocating spool spindle 40 to be moved with and rotatable relative to the reciprocating spool spindle 40 for winding a fishline (not shown) in a known manner.

The bail unit 90 is attached to the rotating unit 110 in a known manner. The rotating unit 110 and the bail unit 90 rotate about the second axis (y) so as to wind a fishline around the spool 80.

Referring to FIGS. 3 and 5, when the handle 50 is rotated by the user to drive the rotating member 20 about the first axis (x), the first cam end 72 of the cam member 70 is movable relative to the first axis (x) along the non-circular path of the non-circular guideway 60 such that the coupling member 30 and the reciprocating spool spindle 40 reciprocate along the second axis (y) through the second cam end 73 and the cam follower 31. Thus, the fishline can be wound around the spool 80.

Figure 6:
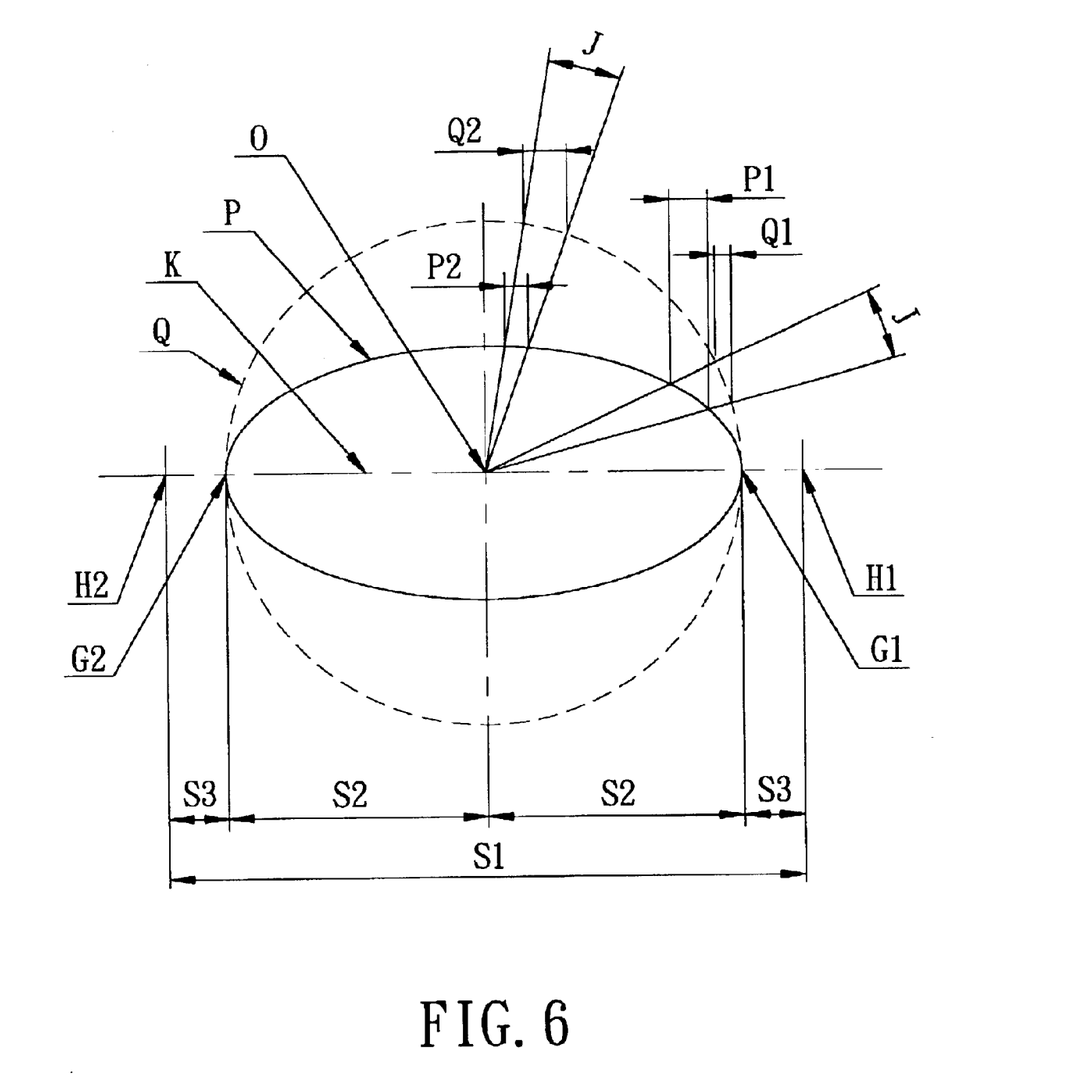
FIG. 6 is a schematic view illustrating the rotational angles of a rotating member during forward and reverse travels of a reciprocating spool spindle of the first preferred embodiment.

Referring to FIG. 6, the first cam end 72 moves along the elliptical path (P) of the guideway 60, and the coupling member 30 and the reciprocating spool spindle 40 move along a path (K). When the first cam end 72 moves to a right limit point (G1), the second cam end 73 moves to a right limit point (H1), and the reciprocating spool spindle 40 is disposed at a right end position. When the first cam end 72 moves to a left limit point (G2), the second cam end 73 moves to a left limit point (H2), and the reciprocating spool spindle 40 is disposed at a left end position. Thus, the reciprocating spool spindle 40 effects a forward travel and a reverse travel during each revolution of the rotating member 20. The distance traveled by the reciprocating spool spindle 40 during each of the forward and reverse travels is indicated by (S1). The distance between the first axis (indicated by (O)) and each of the right and left limit points (G1) and (G2) is indicated by (S2). The distance (S3) between the right limit points (G1) and (H1) or the distance (S3) between the left limit points (G2) and (H2) is the distance between the first and second cam ends 72, 73 in a radial direction relative to the first axis (O). The relationship among these distances can be obtained using the equation: $S1=2\times(S2+S3)$. Accordingly, the distance (S1) between the end positions can be changed by varying the distance (S2) and/or the distance (S3), thereby resulting in an increased changeable range of the distance (S1).

Furthermore, the fishline, which is wound on the spool 80, is shaped as a tubular unit, and is formed with a plurality of turns. When the rotating member 20 rotates by an angle (J), the reciprocating spool spindle 40 moves over a distance (P1) during winding of the fishline around an end portion of the spool 80 to form a predetermined number of turns of the fishline, and over a distance (P2) that is smaller than the distance (P1) during winding of the fishline around a middle portion of the spool 80 to form a predetermined number of turns of the fishline. Accordingly, the number of turns of the fishline wound on the spool 80 reduces gradually from the middle portion of the spool 80 to two end portions of the spool 80.

In the conventional fishing spinning reel shown in FIGS. 1 and 2, because the post 201 of the rotating member 2 moves along a circular path (Q) shown by the phantom lines in FIG. 6, when the rotating member 2 rotates by an angle (J), the reciprocating spool spindle 3 moves over a distance (Q1) during winding of the fishline around an end portion of the spool 6 to form a predetermined number of turns of the fishline, and over a distance (Q2) that is greater than the distance (Q1) during winding of the fishline around a middle portion of the spool 6 to form a predetermined number of turns of the fishline. Accordingly, the number of turns of the fishline wound on the spool 6 increases from the middle portion of the spool 6 to the two end portions of the spool 6. Because the difference between (P1) and (P2) is smaller than that between (Q1) and (Q2), the fishline can be distributed more evenly on the spool 80 of this invention.

Figure 7:
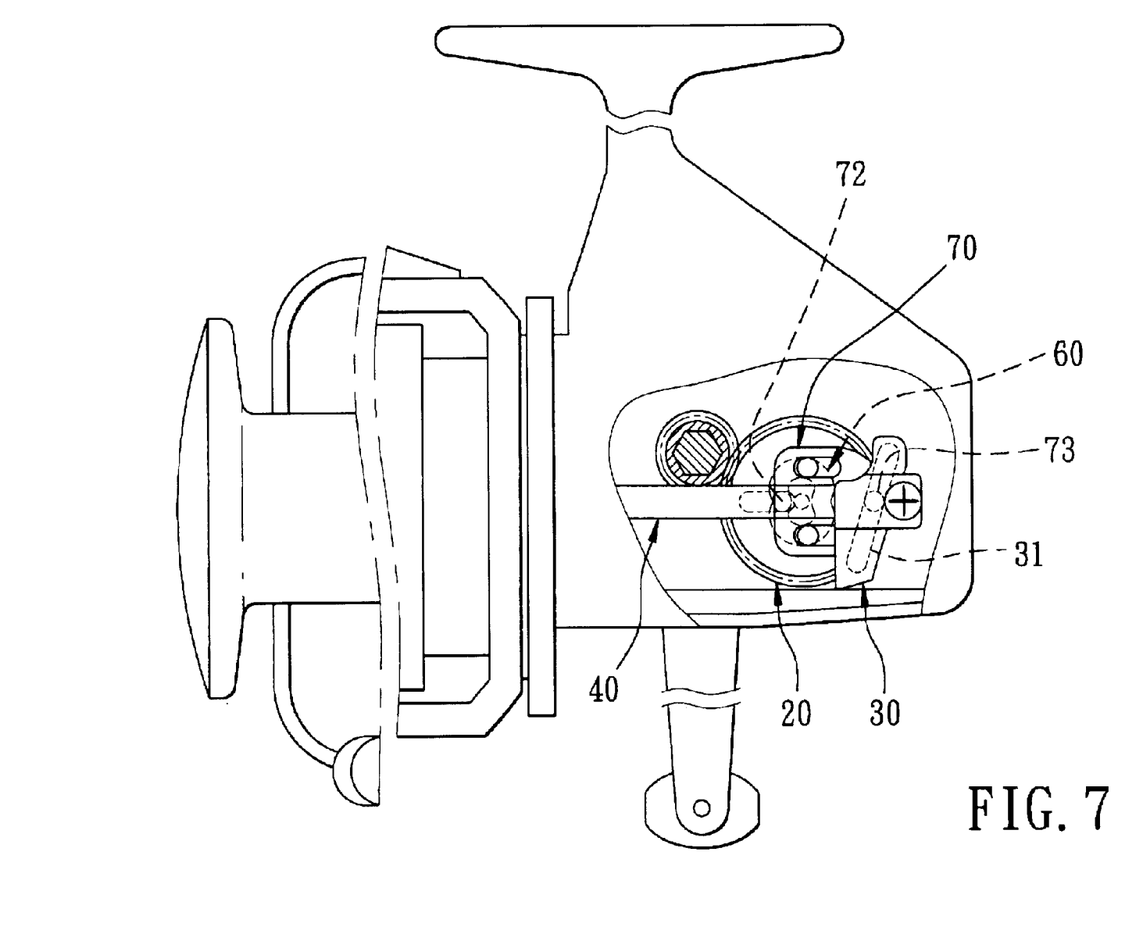
FIG. 7 is a partly sectional view of the second preferred embodiment of a fishing spinning reel according to this invention.
Figure 8:
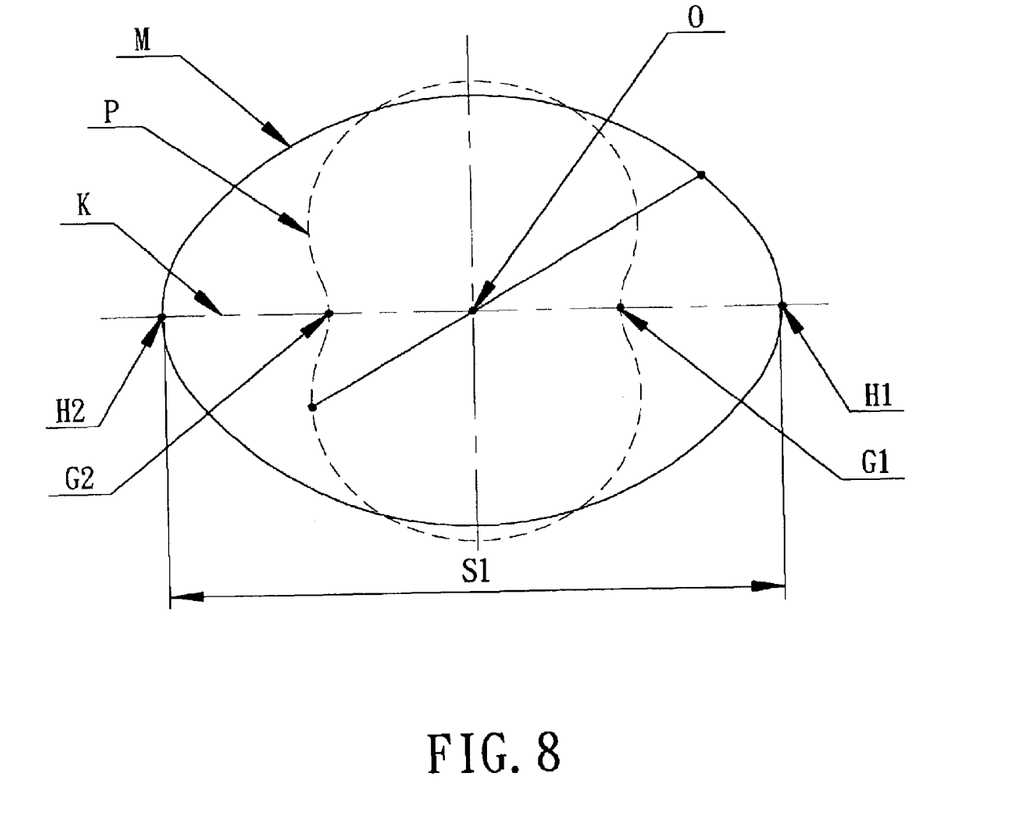
FIG. 8 is a schematic view illustrating the rotational angles of a rotating member during forward and reverse travels of a reciprocating spool spindle of the second preferred embodiment.

Referring to FIGS. 7 and 8, the second preferred embodiment of a fishing spinning reel according to this invention is similar to the first preferred embodiment in construction, except that the non-circular path of the non-circular guideway 60 is substantially gourd-shaped, and that the first and second cam ends 72, 73 of the cam member 70 are disposed at two opposite sides of the first axis (x), respectively.

The first and second cam ends 72, 73 move along the substantially gourd-shaped path (P) and a substantially elliptical path (M), and the coupling member 30 and the reciprocating spool spindle 40 move along a path (K). The path (P) has right and left limit points (G1) and (G2) on the path (K). The path (M) has right and left limit points (H1) and (H2) on the path (K). The distance traveled by the reciprocating spool spindle 40 during each of the forward and reverse travels is indicated by (S1). The distance (S1) can be changed by varying the distance between the second cam end 73 and the first axis (O) and/or the shape of the non-circular path of the non-circular guideway 60, thereby resulting in an increased changeable range of the distance (S1)

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A fishing spinning reel comprising:

a reel frame;

a rotating member disposed in said reel frame and rotatable relative to said reel frame about a first axis in an axial direction, said rotating member having a major wall which defines a plane normal to the first axis, and a slot which is formed in said major wall and which extends towards the first axis;

a reciprocating spool spindle disposed in said reel frame and movable relative to said reel frame along a second axis that is perpendicular to the first axis, said reciprocating spool spindle having first and second spindle ends opposite to each other along the second axis;

a coupling member connected to said first spindle end of said reciprocating spool spindle, and having a cam follower which confronts said major wall of said rotating member in the axial direction;

a cam member having
a first cam end loosely engaged in said slot such that said first cam end is movable relative to the first axis when said rotating member is rotated about the first axis, and
a second cam end disposed opposite to said first cam end in the axial direction, and engaging said cam follower such that said coupling member and said reciprocating spool spindle reciprocate along the second axis when said first cam end is moved relative to the first axis by rotating movement of said rotation member;

a non-circular guideway disposed to guide said first cam end to move along a non-circular path;

a handle mounted on and rotatable relative to said reel frame to drive said rotating member to rotate about the first axis; and a spool mounted to said second spindle end of said reciprocating spool spindle to be moved with and rotatable relative to said reciprocating spool spindle for winding a fishline;

wherein said non-circular guideway is disposed in said reel frame and surrounds the first axis;

wherein said non-circular guideway is integrally formed with said reel frame, said rotating member being disposed between said non-circular guideway and said cam member;

wherein said cam follower includes two opposing walls which are spaced apart from each other in a longitudinal direction parallel to the second axis to confine an elongate sliding groove therebetween;

wherein said cam member includes a slider mounted on and movable relative to said major wall of said rotating member, said first cam end projecting from said slider in the axial direction to be received in said slot, and extending downwardly and outwardly of said slider so as to be in sliding contact with said non-circular guideway, said second cam end projecting from said slider in the axial direction so as to be inserted into said elongate sliding groove;

further comprising a stabilizing member disposed to stabilize movement of said first cam end along said non-circular path; and wherein said stabilizing member includes a post which extends from said major wall of said rotating member in the axial direction, and an elongate groove which is formed in said slider to accommodate said post, thereby regulating the course of movement of said slider relative to said major wall.

* * * * *